United States Patent
Vollmar (12)

(10) Patent No.: US 6,474,186 B1
(45) Date of Patent: Nov. 5, 2002

(54) GEAR-CHANGE SYSTEM FOR AN ELECTRONICALLY CONTROLLED VEHICLE AUTOMATIC GEARBOX

(75) Inventor: Reinhard Vollmar, Ravensburg (DE)

(73) Assignee: ZF Lemförder Metallwaren AG (DE)

( * ) Notice: Subject to any disclaimer, the term of this patent is extended or adjusted under 35 U.S.C. 154(b) by 0 days.

(21) Appl. No.: 09/869,168

(22) PCT Filed: Oct. 25, 2000

(86) PCT No.: PCT/DE00/03777

§ 371 (c)(1),
(2), (4) Date: Jun. 22, 2001

(87) PCT Pub. No.: WO01/31232

PCT Pub. Date: May 3, 2001

(30) Foreign Application Priority Data

Oct. 26, 1999 (DE) .......................................... 199 51 374

(51) Int. Cl.⁷ .............................................. F16H 59/02
(52) U.S. Cl. .................... 74/335; 74/473.12; 74/473.18
(58) Field of Search .............................. 74/335, 473.12, 74/473.18, 473.3

(56) References Cited

U.S. PATENT DOCUMENTS

| | | | | |
|---|---|---|---|---|
| 5,357,820 A | * | 10/1994 | Moroto et al. ................. | 74/335 |
| 5,408,895 A | * | 4/1995 | Chan et al. ..................... | 74/335 |
| 5,799,539 A | * | 9/1998 | Hasse ........................... | 74/335 |
| 5,809,839 A | * | 9/1998 | Beim et al. ..................... | 74/335 |
| 5,816,100 A | * | 10/1998 | Fowler et al. ................. | 74/335 |
| 6,120,412 A | * | 9/2000 | Fujinuma ................. | 74/473.18 |

FOREIGN PATENT DOCUMENTS

| | | |
|---|---|---|
| DE | 38 07 881 C2 | 8/1992 |
| DE | 93 20 309 U1 | 3/1993 |
| DE | 196 37 533 A1 | 3/1998 |
| DE | 298 02 183 U1 | 5/1998 |
| DE | 199 15 892 A1 | 10/1999 |
| EP | 0 725 237 A1 | 8/1996 |
| EP | 0 769 640 A2 | 4/1997 |
| EP | 0 895 003 A1 | 2/1999 |

* cited by examiner

*Primary Examiner*—Sherry Estremsky
(74) *Attorney, Agent, or Firm*—McGlew and Tutle, P.C.

(57) ABSTRACT

A shifting device for an automatic transmission controlled by an electronic control device (2) for vehicles, especially for motor vehicles, is described, which has a first shifting device (4), in which different gears to be shifted automatically can be preselected by manual selection, and a second shifting device (9), which can be actuated by device of a selector device (5) and in which the selector device (5) is held in the neutral middle position, from which it can be moved by manual actuation in a first direction (15) for inducing upshiftings and in a second direction (16) for inducing downshiftings, wherein the shifting movements of the selector device (5) are detected by device of sensors and are sent as signals to the control device (2). The second selector device (5) has a shift position (–) for the selector device (5) for single downshifting into the next lower gear and another shift position (– –) for maximum downshifting into the gear with the lowest possible ratio and/or a shift position (+) for the selector device (5) for single upshifting into the next higher gear and another shift position (++) for maximum upshifting into the gear with the highest possible ratio.

20 Claims, 2 Drawing Sheets

GEAR-CHANGE SYSTEM FOR AN ELECTRONICALLY CONTROLLED VEHICLE AUTOMATIC GEARBOX

FIELD OF THE INVENTION

The present invention pertains to a shifting device for an automatic transmission controlled by an electronic control device for vehicles, especially motor vehicles, with a first shifting device, in which different gears to be shifted automatically can be preselected by manual selection, and with a second shifting device, which can be actuated by a selector device and in which the selector device is held in the neutral middle position, from which it can be moved by manual actuation in a first direction for inducing upshiftings and in a second direction for inducing downshiftings, wherein the shifting movements of the selector device are detected by device of sensors and are sent as signals to the control device.

BACKGROUND OF THE INVENTION

Shifting devices in which a driver selects an automatic travel mode by device of a selector lever have been known from practice, e.g., in passenger car automatic transmissions with electronic control. A shift gate with a plurality of sensors is usually provided for this purpose for the selector lever, where a shift position each of a dynamic shifting program is associated with the sensors. Thus, e.g., a shift position P for park, R for reverse, N for neutral (idle) and D for forward travel (drive), in which automatic shifting between the lowest gear and the highest available gear is performed as a function of the speed with which the gas pedal, the engine speed, the vehicle acceleration and other important variables available in an electronic control device are adjusted, can be mechanically selected with the selector lever. The electronic control device of the automatic operation contains for this purpose modules which automatically change the shifting characteristics of the transmission depending on the driving style and the driving situation.

In addition, such prior-art shifting devices frequently have shift positions for a maximum gear to which upshifting is possible. For example, a fifth gear can be blocked with a shift position "4" if an excessively frequent gear change between the fourth and fifth gears takes place under certain driving conditions, whereas, e.g., upshifting into a higher gear, e.g., on a longer uphill section and on downhill sections in mountains, is prevented from taking place with a shift position "2." Besides, a shift position for the first gear may, of course, be provided as well. Better utilization of the engine output with the use of the engine brake effect can be achieved by the provision of such shift positions for different shifting ranges and a needless upshifting and downshifting is avoided.

To make possible a single manual shifting between the individual gears and to offer the driver the possibility of manual operation, e.g., to achieve a more sporty driving style, such prior-art shifting devices often have an additional shifting device for the so-called "tap shifting," in which shifting into the next lower or next higher gear can be performed by tapping a corresponding sensor by device of the selector lever or a separate switch or button.

Such a shifting device has been known from DE 38 07 881 C2, where the "manual program" of tap shifting is embodied by device of a second shift gate which is parallel to the shift gate of the dynamic shifting program. To carry out the manual program, the selector lever is switched over via a transverse gate into a second shift gate, in which it is held in the neutral middle position by springs and induces upshifting and downshifting during manual pivoting by the shifting movements of the selector lever being detected by sensors, whose signals are sent to the control device of the automatic transmission.

In all described solutions with a manual tap shifting, upshifting into a higher gear is performed manually by tapping a plus sensor and downshifting into the next lower gear is performed manually by tapping a minus sensor, in addition to a dynamic shifting program.

In certain driving situations, in which, e.g., downshifting by several gears or intense upshifting is desirable for extremely great acceleration, this has the drawback that the plus sensor or the minus sensor must be tapped repeatedly in succession. Not only does this compromise the operating comfort, but it may also lead to delays in the manual program, which may jeopardize safety, and to inappropriate behavior on the part of the driver in critical driving situations, e.g., during passing.

SUMMARY AND OBJECTS OF THE INVENTION

The object of the present invention is therefore to provide a shifting device for an automatic transmission controlled by an electronic control device for vehicles, especially for motor vehicles, in which downshifting or upshifting by several gears is simplified in terms of operation in a manual program.

A shifting device for an automatic transmission controlled by an electronic control device for vehicles, especially motor vehicles, has a first shifting device in which different gears to be shifted automatically can be preselected by manual selection. The device has a second shifting device, which can be actuated by a selector and in which the selector is held in the neutral middle position, from which it can be moved by manual actuation in a first direction for inducing upshiftings and in a second direction for inducing downshiftings. The shifting movements of the selector are detected by sensors and are sent as signals to the control device. The second shifting device has a shift position for the selector for single downshifting into the next lower gear and another shift position (−−) for maximum downshifting into the gear with the lowest possible ratio and/or a shift position (+) for the selector for single upshifting into the next higher gear and another shift position (++) for maximum upshifting into the gear with the highest possible ratio.

The operating comfort for the desired downshiftings or upshiftings by several gears in the manual program is optimized for the driver with the shifting device according to the present invention.

Contrary to conventional tap shifting, it is no longer necessary to perform a separate tapping movement of the selector device for each gear to which downshifting or upshifting is to be performed, but a single tapping movement is sufficient in order to perform a maximum downshifting or upshifting.

In an especially advantageous embodiment of the present invention, provisions may be made to provide an increased movement resistance for the selector device at the transition from the shift position for the single downshifting into the shift position for the maximum downshifting and at the transition from the shift position for single upshifting into the shift position for maximum upshifting. The driver will thus clearly notice that he selects the shift position for maximum downshifting or maximum upshifting, so that an accidental tapping of this shift position and consequently an undesired shifting or even a shifting compromising the stability of the vehicle is clearly avoided. Provisions may, of course, be made that only one shift position is present for single upshifting while the shift positions for single downshifting and for maximum downshifting are available for the downshifting, because a maximum downshifting is desirable especially for sporty drivers more frequently than a maximum upshifting.

The shifting device according to the present invention is especially suitable for motor vehicles with an electronically controlled vehicle automatic transmission, which may be a sequential automatic transmission or a CVT automatic transmission. However, applications in other types of vehicles, e.g., motorcycles or watercraft with electronically controlled vehicle automatic transmissions are also conceivable, because the drivers of such vehicles also frequently wish to have shiftings, especially downshiftings, with maximum speed by several gears.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
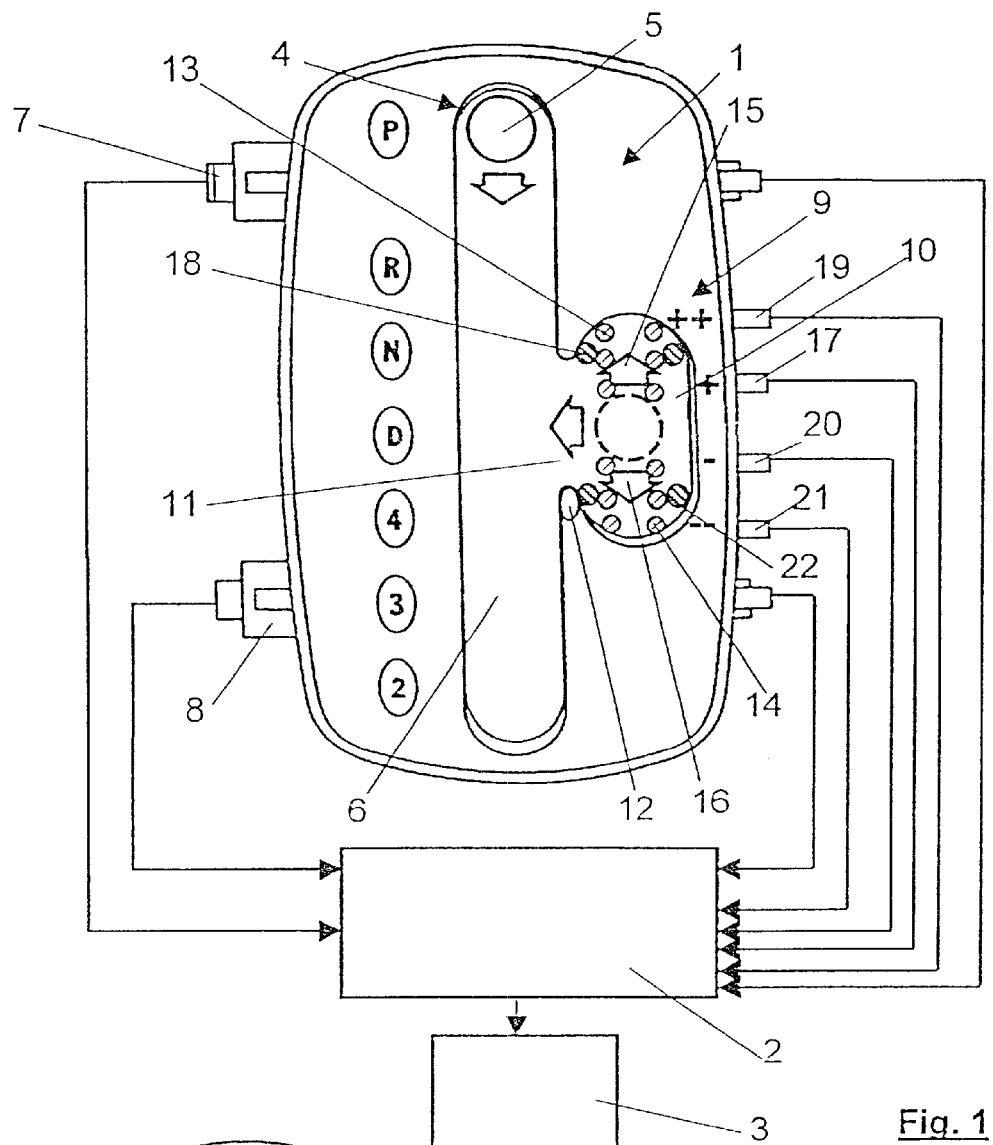
FIG. 1 is a schematic view of a shifting device for a vehicle automatic transmission according to the present invention, which is controlled by an electronic control device.

Referring to the drawings in particular, FIG. 1 shows a shifting device 1 for a vehicle automatic transmission 3 controlled by an electronic control device 2, where the automatic transmission is indicated only symbolically. The shifting device 1, which is provided in a passenger car here, has a first shifting device 4 for a dynamic shifting program, in which transmission gears to be shifted automatically can be preselected by selecting a shift position P for parking the vehicle, a shift position R for reverse, a shift position N for neutral, and a shift position D for automatic forward travel as determined by an adaptive transmission control. This is done by device of a selector lever 5, which acts as a selector device and is displaceable in a first shift gate 6, in which sensors for the above-described shift positions are arranged. Besides\ the shift positions P, R, N and D, additional shift positions "4" for a forth gear, "3" for a third gear and "2" for a second gear, in which the shifting is performed automatically between the first gear and this named gear, are also provided in this first shift gate 6. The shifting of the first gear with braking effect takes place electronically as a function of the shift position "2" and the speed of travel. The position of the selector lever 5, which is detected by device of sensors, is sent as signals to the electronic control device 2 via signal transmission device 7, 8.

Besides the first shifting device 4 for the automatic shifting in the dynamic shifting program, a second shifting device 9 is provided for performing a manual program by device of tap shifting. A second shift gate 10, into which the selector lever 5 can be switched over via a transverse gate 11, is arranged for this purpose in parallel to the first shift gate 6. To detect the switchover movement between the first shifting device 4 and the second shifting device 9, a sensor 12, which is indicated only symbolically in FIG. 1, is arranged in the area of the transverse gate 11. Thus, the first shifting device 4 for performing the dynamic shifting program and the second shifting device 9 with the manual program can be operated with the selector lever 5 simultaneously.

When the selector lever S is in the second shifting device 9, it is held by springs 13, 14 in a neutral middle position indicated by dash-dotted lines in FIG. 1, from which it can be moved by manual actuation in a first direction indicated by arrow 15 to induce upshiftings and in a second direction indicated by an arrow 16 to induce downshiftings.

The design embodiment of the selector lever with respect to its pivotability in the gate of the shifting device 1 corresponds to the conventional design known per se, and it may be designed, e.g., as described in DE 38 07 881 C2.

When the selector lever is displaced in direction 15 for upshifting, the selector lever first reaches a shift position "+" for single upshifting into the next higher gear, in which a plus sensor 17 responds and sends a corresponding signal to the electronic control device 2. When the driver displaces the selector lever 5 farther in direction 15, a movement resistance for the selector lever 5, which is brought about by an additional spring 18 with greater spring force, must be overcome before the selector lever reaches a shift position "++" for maximum upshifting into the gear with the highest ratio and contacts a plus-plus sensor 19 there, which sends this shifting movement as a signal to the electronic control device 2.

A shift position "−" for the selector device 5 for single downshifting into the next lower gear and a shift position "−−" arranged downstream for maximum downshifting into the gear with the lowest possible ratio are analogously provided when viewed in the opposite direction 16 of movement from the middle position in the second shift gate 6. A minus sensor 20 is associated with the shift position "−" for single downshifting, into which the selector lever 5 can be displaced against the force of the spring 14, and a minus-minus sensor 21, which is likewise connected to the electronic control device 2, is correspondingly associated with the shift position "−−" for the maximum downshifting. To reach the shift position "−−" for maximum downshifting, the force of a second spring 22, which brings about an increased movement resistance for the transition from the shift position "−" to the shift position "−−," must be overcome in this case as well, as in the case of a maximum upshifting.

The movement resistance for the selector lever 5 for reaching the shift position "−−" for the maximum downshifting or the shift position "++" for the maximum upshifting can, of course, also be brought about with other mechanical, hydraulic or pneumatic devices.

Figure 2:
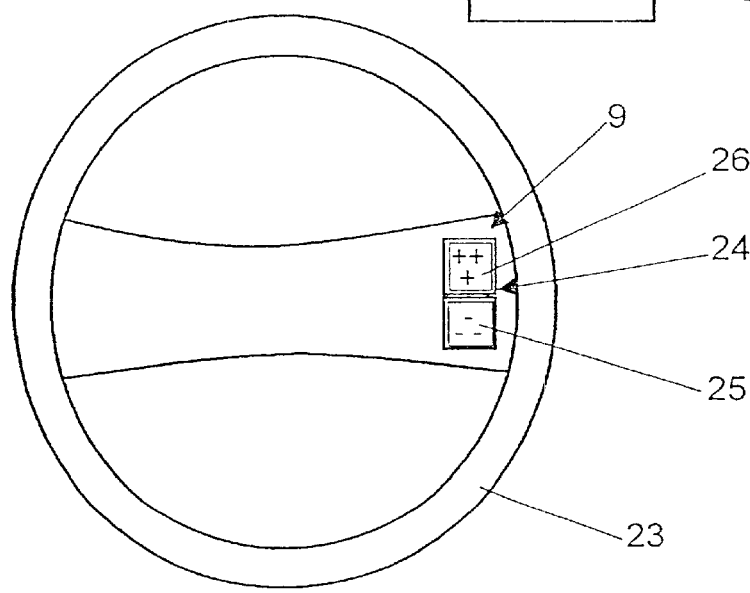
FIG. 2 is a schematic view of another embodiment of the shifting device according to the present invention with a selector device designed as a tapping button on a multifunction steering wheel.

As is shown in FIG. 2, the second shifting device 9 may also be provided separately from the first shifting device 4 and be arranged, e.g., on a multifunction steering wheel 23. The selector device for actuating the second shifting device 9 with the manual program is no longer identical in this case to the selector lever 5 of the first shifting device 9. The selector device of the second shifting device 9 may be designed here, e.g., as a tap button 24. In the embodiment that is shown extremely schematically in FIG. 2, the tap button 24 has a first button 25 for downshiftings and a second button 26 for upshiftings.

In the unactuated state, the buttons 25 and 26 are in a neutral "middle position," i.e., neither of the buttons 25 or 26 is depressed to induce a function associated with it. The buttons 25 and 26 have two button positions each, where the shift position "−" for single downshifting "+" is associated with the first button position of button 25 and the shift position "−−" for maximum downshifting is associated with the second button position, in which the button 25 is depressed more deeply. Analogously to this, the button 26 has a first button position for the shift position "+" for single upshifting and a second, deeper button position for the shift position "++" for maximum upshifting, where the shift position "++" may be present optionally. To prevent accidental downshiftings or upshiftings from occurring, an increased movement resistance must also be overcome in this embodiment of the second shifting device 9 at the transition from the shift position "−" for single downshifting to the shift position "−−" for maximum downshifting and analogously at the transition from the shift position "+" to the shift position "++." The design embodiment of the buttons 25 and 26 of the selector device 24 may correspond to the embodiments generally known for buttons.

Figure 3:
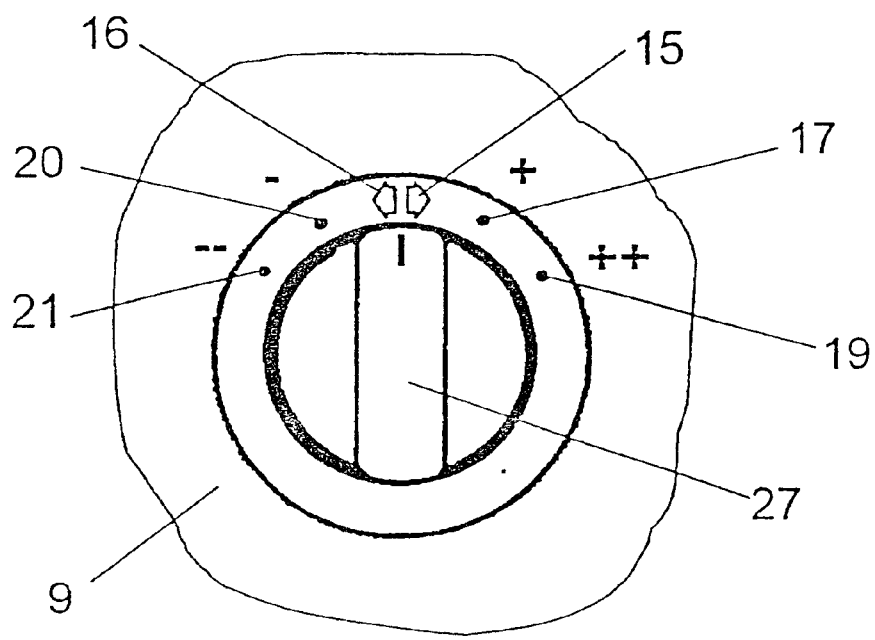
FIG. 3 is a schematic view of another embodiment of the selector device of the shifting device according to the present invention as a rotary switch.

FIG. 3 shows another alternative embodiment of the selector device for the second shifting device 9 for performing the manual program with a rotary switch 27. The switch 27, which is shown in the neutral middle position and is designed as a conventional rotary switch, can be rotated to the left in direction 16 for performing downshiftings first into the shift position "−" for single downshifting and, on further rotation in direction 16 against increased resisting force, into the shift position "−−" for maximum downshifting, where the rotary switch 27 contacts the minus sensor 20 and the minus-minus sensor 21, which are connected to the electronic control device 2 and are indicated only symbolically here. The rotary switch 27 can be rotated in the opposite direction 15 into the shift position "+" for performing single upshiftings and into the shift position "++" for performing maximum upshifting, the plus sensor 17 and the plus-plus sensor 19 being associated with the shift positions in this case as well.

Figure 4:
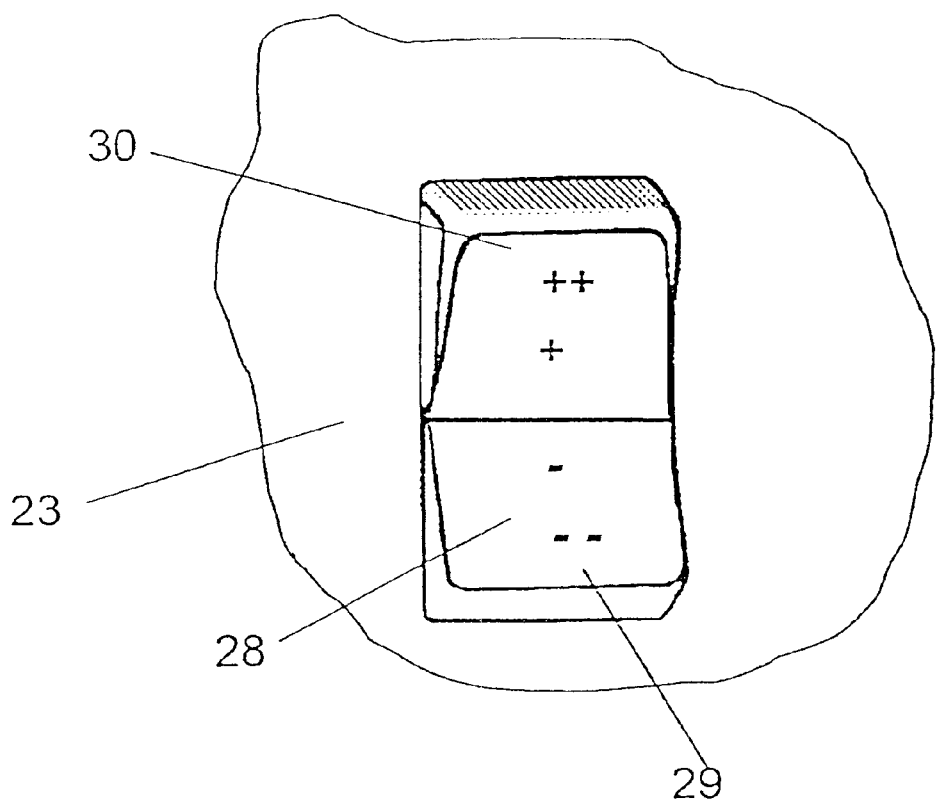
FIG. 4 is a schematic view of another embodiment of the selector device of the shifting device according to the present invention as a rocker-type switch.

FIG. 4 shows another embodiment of the selector device for the second shifting device 9 as a rocker-type switch, which is arranged on the multifunction steering wheel in the embodiment shown, but it may, of course, also be provided in other areas in the vehicle.

The rocker-type switch 28 has a prior-art design and has two positions in each rocking direction, the shift position "−" for single downshifting being reached first on actuation of a lower area 29 of the rocker-type switch 28 and the shift position "−−" for maximum downshifting being reached on stronger pressure. In the same manner, the shift position "+" is reached on pressing an upper area 30 of the rocker-type switch 28 and the shift position "++" for maximum upshifting, which position is provided optionally, is reached on stronger actuation.

The shifting device 1 according to the present invention described is especially suitable for automatic transmissions with many gears, in which a great gear jump can be performed with a single tapping movement. To prevent unacceptably great downshifting, "maximum downshifting" is defined here as a downshifting that is allowable in terms of the speed, i.e., a downshifting is possible only if the allowable limit speed is not exceeded after the downshifting. It is thus ensured that the transmission is not damaged by abusive operation of the manual program.

While specific embodiments of the invention have been shown and described in detail to illustrate the application of the principles of the invention, it will be understood that the invention may be embodied otherwise without departing from such principles.

What is claimed is:

1. A vehicle shifting device for an automatic transmission controlled by an electronic control device, the shifting device comprising:
   a first shifting device, in which different gears to be shifted automatically can be preselected by manual selection; and
   a second shifting device, which can be actuated by a selector and in which the selector is held in the neutral middle position, from which it can be moved by manual actuation in a first direction for inducing upshiftings and in a second direction for inducing downshiftings, wherein the shifting movements of said selector are detected by sensors and are sent as signals to the said control device, said second shifting device having a shift position for the selector for single downshifting into the next lower gear and another shift position for maximum downshifting into the gear with the lowest possible ratio and/or a shift position for the selector for single upshifting into the next higher gear and another shift position for maximum upshifting into the gear with the highest possible ratio.

2. A shifting device in accordance with claim 1, wherein an increased movement resistance for said selector is provided at a transition from the shift position for the single downshifting into the shift position for maximum downshifting and at the transition from the shift position for the single upshifting into the shift position for the maximum upshifting.

3. A shifting device in accordance with claim 1, wherein a minus sensor inducing the single downshiftings and a minus-minus sensor for inducing the maximum downshiftings and/or a plus sensor inducing the single upshiftings and a plus-plus sensor inducing the maximum upshiftings are arranged in said second shifting device.

4. A shifting device in accordance with claim 3, wherein said plus sensor and said plus-plus sensor and/or said minus sensor and said minus-minus sensor are arranged in said second shifting device such that said plus-plus sensor is arranged downstream of said plus sensor and said minus-minus sensor is arranged downstream of said minus sensor with respect to a direction from a middle position of said selector.

5. A shifting device in accordance with claim 3, wherein said selector comprises a selector lever for actuating said first shifting device and said second shifting device wherein said selector lever can be switched over from said first shifting device having a first shift gate, via a transverse gate, into a second shift gate of said second shifting device, said second shift gate being parallel to said first shift gate and wherein said minus sensor and said minus-minus sensor and/or said plus sensor and said plus-plus sensor are arranged at said second shift gate.

6. A shifting device in accordance with claim 1, wherein said selector is held in the neutral middle position in said second shifting device by springs.

7. A shifting device in accordance with claim 1, wherein said selector is counteracted by a spring force of a respective first spring for selecting said shift position for the single downshifting or single upshifting and by a stronger spring force of a respective second spring for selecting the shift position for the maximum downshifting or maximum upshifting.

8. A shifting device in accordance with claim 1, wherein said selector comprises a tapping button.

9. A shifting device in accordance with claim 1, wherein said selector comprises a rocker switch.

10. A shifting device in accordance with claim 1, wherein said selector comprises a rotary switch.

11. A shifting device in accordance with claim 1, wherein said selector and at least said second shifting device are arranged on a multifunction steering wheel.

12. A shifting device in accordance with claim 1, wherein said selector comprises a selector lever for actuating said first shifting device and said second shifting device wherein said selector lever can be switched over from said first shifting device having a first shift gate, via a transverse gate, into a second shift gate of said second shifting device, said second shift gate being parallel to said first shift gate.

13. A shifting arrangement, comprising:
an electronic control device;
an automatic transmission controlled by said electronic control device;
a first shifting device, in which different gears to be shifted automatically can be preselected by manual selection; and
a second shifting device, which can be actuated by a selector and in which the selector is held in the neutral middle position, from which it can be moved by manual actuation in a first direction for inducing upshiftings and in a second direction for inducing downshiftings, wherein the shifting movements of said selector are detected by sensors and are sent as signals to the said control device, said second shifting device having a shift position for the selector for single downshifting into the next lower gear and another shift position for maximum downshifting into the gear with the lowest possible ratio and/or a shift position for the selector for single upshifting into the next higher gear and another shift position for maximum upshifting into the gear with the highest possible ratio.

14. A shifting arrangement in accordance with claim 13, further comprising a selector resistance having an increased movement resistance value at a transition from the shift position for the single downshifting into the shift position for maximum downshifting and at the transition from the shift position for the single upshifting into the shift position for the maximum upshifting.

15. A shifting device in accordance with claim 13, wherein said second shifting device includes a minus sensor inducing the single downshiftings and a minus-minus sensor for inducing the maximum downshiftings.

16. A shifting device in accordance with claim 15, wherein said minus sensor and said minus-minus sensor are arranged in said second shifting device with said minus-minus sensor arranged subsequent to said minus sensor with respect to a direction from a middle position of said selector.

17. A shifting device in accordance with claim 13, wherein said second shifting device includes a plus sensor inducing the single upshiftings and a plus-plus sensor inducing the maximum upshiftings are arranged in said second shifting device.

18. A shifting device in accordance with claim 17, wherein said plus sensor and said plus-plus sensor are arranged in said second shifting device with said plus-plus sensor arranged subsequent to said plus sensor with respect to a direction from a middle position of said selector.

19. A shifting device in accordance with claim 13, wherein said selector and at least said second shifting device are arranged on a multifunction steering wheel.

20. A shifting device in accordance with claim 13, wherein said selector comprises a selector lever for actuating said first shifting device and said second shifting device wherein said selector lever can be switched over from said first shifting device having a first shift gate, via a transverse gate, into a second shift gate of said second shifting device, said second shift gate being parallel to said first shift gate.

* * * * *